Figure 1:
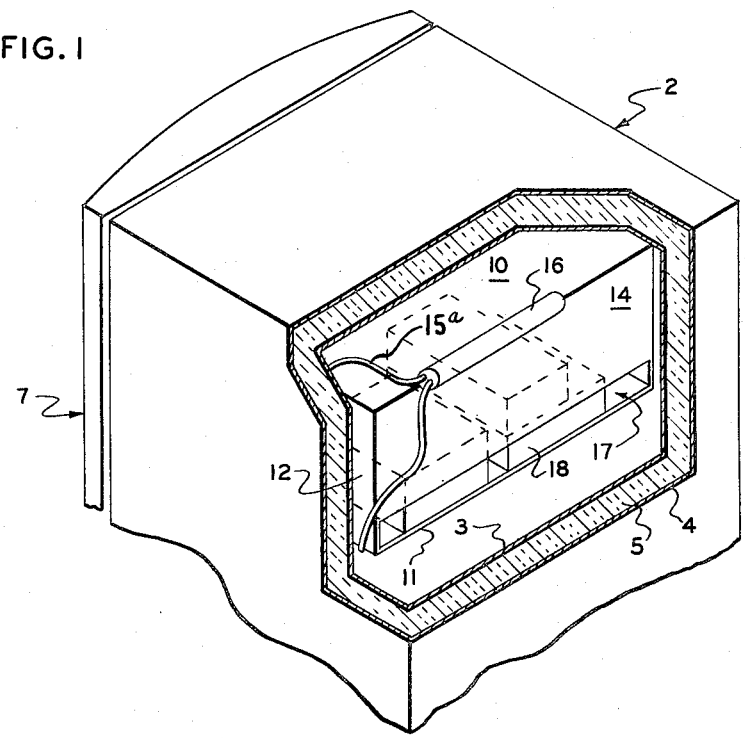

Aug. 14, 1956   E. F. SHELL ET AL   2,758,448
HOUSEHOLD REFRIGERATOR
Filed April 16, 1954

INVENTOR.
ERNEST F. SHELL
HAROLD P. HARLE
BY
THEIR ATTORNEY

United States Patent Office 2,758,448
Patented Aug. 14, 1956

2,758,448

HOUSEHOLD REFRIGERATOR

Ernest F. Shell, Erie, Pa., and Harold P. Harle, Louisville, Ky., assignors to General Electric Company, a corporation of New York Application April 16, 1954, Serial No. 423,688

1 Claim. (Cl. 62—99)

This invention relates to household refrigerators and, more particularly, to a household refrigerator including a frozen food compartment.

Household refrigerators of the single door type normally have an evaporator in the form of a closed frozen food compartment disposed across the upper portion of the fresh food storage compartment. This compartment has top, back, side and bottom walls with the evaporator tubing secured in contact with one or more of the walls. In order to maintain the interior of the frozen food compartment at freezing temperatures, a door is normally provided for closing the opening front of the compartment. As the evaporator tubing is in direct heat exchange contact with the walls of the compartment it serves to preserve the frozen foods placed in the compartment at temperatures below freezing.

The fresh food compartment of the refrigerator is maintained at suitable temperatures for example in the neighborhood of 35° F. by the natural circulation of air within the compartment upwardly into contact with the evaporator and downwardly along the rear wall of the refrigerator cabinet. As the refrigerating system for this type of refrigerator is operated in response to the temperature conditions within the cabinet, the total operating time for the system is dependent upon the time required for the evaporator surfaces contacted by the circulating air to cool the air within the fresh food storage compartment to the desired temperature. Thus, it will be seen that for any given evaporator operating at a given temperature the running time of the refrigeration system is dependent upon the area of the evaporator available for cooling the fresh food compartment air.

In the type of refrigerator structure described hereinbefore only the exterior surfaces of the evaporator are available for cooling the fresh food compartment air. Due to the construction of the frozen food compartment, the interior surfaces of that compartment, which in effect form part of the evaporator structure, are not normally available for cooling the fresh food compartment air regardless of whether the frozen food compartment is empty or full. While this arrangement is desirable and in fact necessary when it is desired to maintain food stored within the frozen food compartment at below freezing temperatures, it has the disadvantage that only the exterior of the frozen food compartment are available for cooling the fresh food compartment air regardless of whether or not the interior surfaces thereof are required to maintain frozen food at below freezing temperatures.

Accordingly, it is a primary object of the present invention to provide a refrigerator including a frozen food compartment so designed that both the exterior and interior surfaces of the evaporator wall structure of the compartment are available for cooling the fresh food compartment air when the frozen food compartment is empty or substantially empty.

Further objects and advantages of the invention will become apparent as the following description proceeds and the features of novelty which characterize the invention will be pointed out with particularity in the claim annexed to and forming a part of this specification.

In accordance with this invention, there is provided a refrigerator having a cabinet that provides a fresh food storage compartment and a door that provides access to the compartment. A frozen food compartment is disposed in the upper portion of the fresh food storage compartment and has evaporator tubing disposed in direct heat exchange relation therewith to cool the frozen food compartment and the fresh food compartment. The frozen food compartment has top, bottom, side, and rear walls with a door providing access to the frozen food compartment but slightly spaced therefrom. One of the walls has a gap therein that permits air flow between the interior of the frozen food compartment and the fresh food compartment with this air flow being from the fresh food compartment through the space between the door and the frozen food compartment to the interior of the frozen food compartment and through the gap to the fresh food compartment. This gap is of less area than the wall and is disposed substantially adjacent the intersection of the bottom wall and one of the other walls. The air flow between the interior of the frozen food compartment and the fresh food compartment is substantially stopped by disposing contents in the interior of the frozen food compartment.

Figure 2:
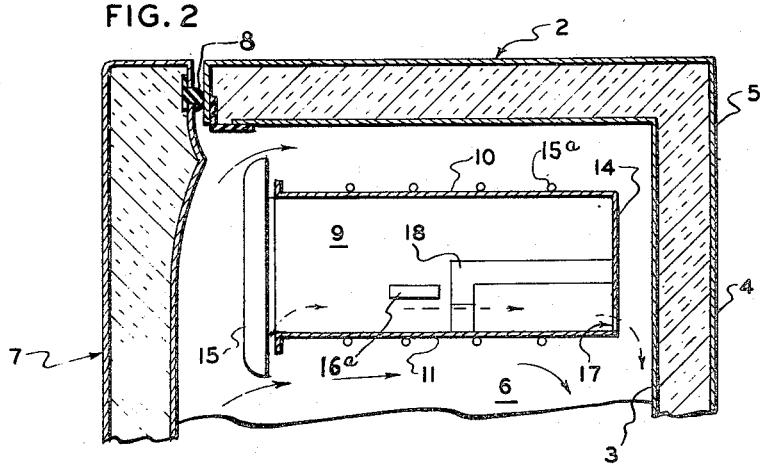

For a better understanding of the invention, reference may be had to the accompanying drawing, in which:

Fig. 1 is an isometric view of a refrigerator embodying the present invention; and Fig. 2 is a sectional view of a portion of a refrigerator embodying the present invention.

Referring to the drawing and particularly Fig. 1, there is shown a refrigerator cabinet 2 having an inner liner 3 and an outer casing 4 with suitable insulation 5 disposed therebetween. A fresh food storage compartment 6 is disposed within the cabinet 2 and a door 7 is provided to permit access to the fresh food compartment 6. A suitable gasket 8 is provided between the door 7 and the cabinet 2 to prevent leakage between the door 7 and the cabinet 2.

A frozen food compartment 9 is disposed in the upper portion of the fresh food compartment 6, as shown in Fig. 2. This compartment 9 has a top wall 10, a bottom wall 11, side walls 12, and a rear wall 14. A door 15 provides access to the frozen food compartment 9 but is spaced slightly therefrom in its closed position to permit air flow therebetween into the interior of compartment 9. An evaporator tube 15a is disposed in heat exchange relation with at least the bottom wall 11 of the compartment 9 to provide refrigeration to retain the contents of the frozen food compartment 9 in their frozen condition and to cool the fresh food compartment. The header 16 of this evaporator is shown disposed adjacent the top wall 10 and rear wall 14 (see Fig. 1). It will be understood that this evaporator is part of the usual well known refrigerating system, which will refrigerate the evaporator under the control of a thermostat 16a located in contact with the evaporator. This evaporator, by means of thermostat 16a, maintains the fresh food storage compartment 6 at temperatures above freezing preferably about 35° F. to 40° F.

The rear wall 14 of the frozen food compartment 9 has its lower portion cut away to provide a gap 17 that will permit communication between the interior of the frozen food compartment 9 and the fresh food compartment 6. This gap or opening 17 preferably extends across the entire width of the frozen food compartment 9. In the embodiment of the invention illustrated, about one inch of the rear wall is cut away to provide the gap. The exact size of this gap or opening is not critical for the present invention.

Due to the fact that there is more heat leakage through the door 7 than through the back wall of the refrigerator, the flow of air in the refrigerator is by circulation up past the door, over the evaporator, and then down the back wall. The circulation of air in compartment 6 when the gap 17 is closed is indicated by the full arrows. By disposing the gap 17 in the rear wall 14 of the frozen food compartment 9, some of the air flows through the interior of the frozen food compartment 9 as shown by the dotted arrows when the gap is open since the door 15 is spaced from the walls of the frozen food compartment 9 (see Fig. 2), as well as over the exterior of the frozen food compartment 9 as shown by the full arrows. This, of course, increases the heat transfer between the evaporator and the fresh food compartment 6 when the interior of the frozen food compartment 9 is empty or lightly loaded since the cooling effect of the inner surfaces of the evaporator is directed by the air to the fresh food compartment 6 through the gap 17. This results in a lower temperature differential between the evaporator and the food storage compartment, that is a higher operating temperature for the evaporator provided the fresh food compartment is maintained at the same temperature.

The amount of air that is flowing through the gap 17 from the interior of the frozen food compartment 9 to the fresh food compartment 6 depends upon the quantity of the contents or frozen packages indicated in phantom lines at 18 in the frozen food compartment 9 and the location of the contents with respect to the gap. Thus, if the frozen food compartment 9 is completely loaded, the gap 17 will obviously be completely closed so that there will be no air circulation between the interior of the frozen food compartment 9 and the fresh food compartment 6. However, if the frozen food compartment 9 is completely empty, then the gap 17 will permit maximum flow of air between the interior of the frozen food compartment 9 and the fresh food compartment 6. It will be understood that while the first layer of contents disposed in the interior of the frozen food compartment may not close the gap 17, this layer is maintained at the desired temperature by being in direct heat exchange relation with the portion of the evaporator that is in contact with the bottom wall 11.

Thus, it will be seen that during light usage of the frozen food compartment 9 when the compartment is empty or the contents therein are insufficient to close the gap 17 a greater amount of cooling effect from the evaporator is directed into the fresh food compartment 6 since the air is cooled not only by passing over the exterior of the compartment 9, which has evaporator tube 15a in heat exchange relation therewith, but also by passing through the interior of compartment 9.

If the temperature of the fresh food compartment 6 were maintained the same, the operating expense of the refrigerator would be less when the frozen food compartment 9 is empty since more cooling effect is directed to the compartment 6 from the interior of the compartment 9; it being understood that the evaporator would therefore operate at a higher temperature. When the size of the gap is reduced due to the increased loading of the frozen food compartment 9 with contents 18, the flow of air through the interior of the frozen food compartment 9 is accordingly reduced. This results in more cooling effect from the evaporator being directed to the interior of the frozen food compartment rather than to the fresh food compartment 6.

If the fresh food compartment 6 were maintained at the same temperature, it is obvious that the interior of the compartment 9 would be at a colder temperature when the flow of air therethrough is reduced since this reduces the effective evaporator surface area available for cooling the compartment 6.

It will be apparent that the present invention provides a simple and inexpensive way of reducing the power consumption of the refrigerator when the frozen food compartment does not require as much refrigeration. It will be understood that the gap could be of a width less than the entire width of the frozen food compartment. Similarly, if desired, the gap could be provided in one of the other walls of the frozen food compartment.

The present invention has the advantage of providing an even temperature gradient within the frozen food compartment due to the increased air circulation therein caused by the gap. This invention also has the advantage of permitting the fresh food compartment to be maintained at the same temperature with a reduction in operating expense when the load in the frozen food compartment is reduced.

While the present invention has been described by reference to a particular embodiment thereof, it will be understood that modifications may be made by those skilled in the art without actually departing from the invention. Therefore, the appended claim is intended to cover all such variations as come within the true spirit and scope of the invention.

We claim:

In a refrigerator having a cabinet providing a fresh food storage compartment, a door providing access to said compartment, a frozen food compartment disposed in the upper portion of said fresh food storage compartment, evaporator tubing disposed in heat exchange relation with said frozen food compartment to cool said frozen food compartment and said fresh food compartment, said frozen food compartment having top, bottom, side and rear walls, a door providing access to said frozen food compartment but slightly spaced therefrom when in its closed position, said rear wall having a gap therein to permit air flow between the interior of said frozen food compartment and said fresh food compartment; said air flow being from said fresh food compartment through the space between said door and said frozen food compartment to the interior of said frozen food compartment and through said gap to said fresh food compartment, said gap extending across the complete width of said rear wall, said gap being of less area than said rear wall, said gap being disposed in the rear wall substantially adjacent said bottom wall; said air flow between the interior of said frozen food compartment and said fresh food compartment being substantially stopped by disposing contents in the interior of said frozen food compartment.

References Cited in the file of this patent

UNITED STATES PATENTS

| | | |
|---|---|---|
| 2,398,035 | Pacifico | Apr. 9, 1946 |
| 2,663,999 | Alsing | Dec. 29, 1953 |